United States Patent
Nickel et al.

[11] 3,960,831
[45] June 1, 1976

[54] DISAZO DYESTUFFS CONTAINING AMINO AZO BENZENE SULFONIC ACID AND PHENOLIC OR NAPHTHOLIC COUPLERS

[75] Inventors: Horst Nickel; Fritz Sückfüll, both of Leverkusen, Germany

[73] Assignee: Bayer Aktiengesellschaft, Leverkusen, Germany

[22] Filed: May 1, 1970

[21] Appl. No.: 33,940

[30] Foreign Application Priority Data
May 9, 1969 Germany.......................... 1923680

[52] U.S. Cl............................... 260/186; 260/177; 260/187; 260/191; 260/205; 260/206; 260/207
[51] Int. Cl.².................. C09B 31/04; C09B 31/06; D06P 3/04; D06P 3/24
[58] Field of Search................ 260/217 B, 242.11 B, 260/242.14 B, 242.15 B, 242

[56] References Cited
UNITED STATES PATENTS

| | | | |
|---|---|---|---|
| 1,327,688 | 1/1920 | Taggesell | 260/177 |
| 1,815,827 | 7/1931 | Bodmer | 260/187 |
| 1,979,534 | 11/1934 | Ebert | 260/177 |
| 2,152,408 | 3/1939 | Graenacher et al. | 260/186 |
| 2,192,153 | 2/1940 | Roos | 260/187 X |
| 2,708,668 | 5/1955 | Suckfull | 260/187 X |
| 2,729,630 | 1/1956 | Krzikalla et al. | 260/177 X |
| 3,109,841 | 11/1963 | Gumprecht et al. | 260/187 X |

Primary Examiner—Floyd D. Higel
Attorney, Agent, or Firm—Plumley & Tyner

[57] ABSTRACT

Disazo dyestuffs which in the form of the free acid correspond to the formula

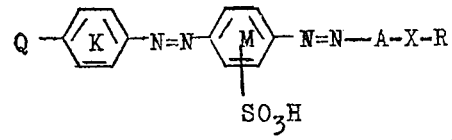

pivotal
wherein Q represents a hydroxyl group, an alkoxy group or an acylamino group, A is a radical of the benzene or naphthalene series which is optionally further substituted, R represents hydrogen or an alkyl radical, X denotes —O— or —NH— and the benzene nucleus K can further be substituted by non-ionic radicals and the benzene nucleus M can further be substituted by halogen, alkyl or alkoxy groups.

The new dyestuffs are particularly suitable for dyeing and printing natural and synthetic fiber materials containing amide groups. The resulting dyeings are distinguished by good wet fastness properties and good light fastness properties.

1 Claim, No Drawings

DISAZO DYESTUFFS CONTAINING AMINO AZO BENZENE SULFONIC ACID AND PHENOLIC OR NAPHTHOLIC COUPLERS

The subject of the present invention are valuable new disazo dyestuffs which in the form of the free acids correspond to the formula

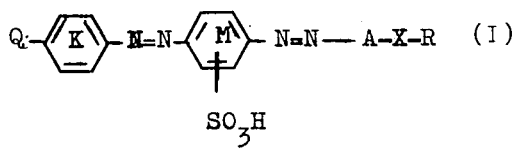

wherein
- Q represents a hydroxyl group, an alkoxy group or an acylamino group,
- A is a radical of the benzene or naphthalene series which is optionally further substituted,
- R represents hydrogen or an alkyl radical,
- X denotes —O— or —NH—, and
- the benzene nucleus K can further be substituted by non-ionic radicals and
- the benzene nucleus M can be substituted by halogen, alkyl or alkoxy groups.

Preferred dyestuffs are those of formula

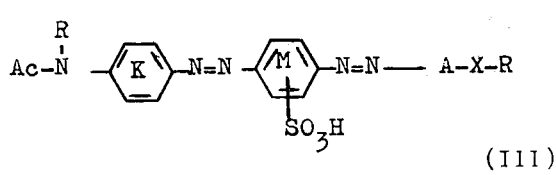

wherein
A, X and R have the abovementioned significance, as well as those of formula

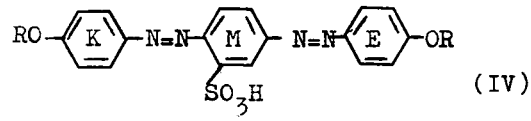

wherein
A, X and R have the above significance, and
Ac represents an acyl radical.

Particularly valuable dyestuffs are those of formulae

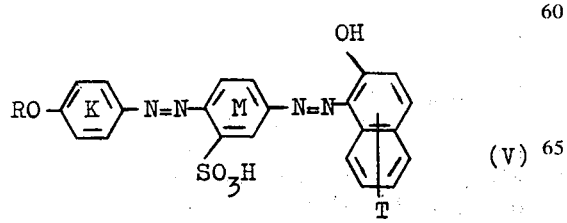

and

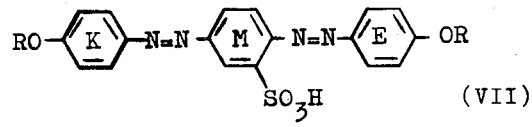

wherein
- R has the abovementioned significance,
- the radicals K and M can be substituted as indicated above,
- the benzene nucleus E can be substituted by non-ionic radicals and
- T represents an optionally substituted carboxylic acid amide group or an acylamino group.

Within the framework of the dyestuffs of formula (V), those in which the acylamino group is in the 8-position and the carboxylic acid amide or carboxylic acid anilide group is in the 3-position are here particularly preferred.

Further valuable dyestuffs are those of formulae

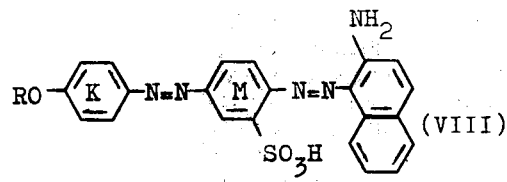

and

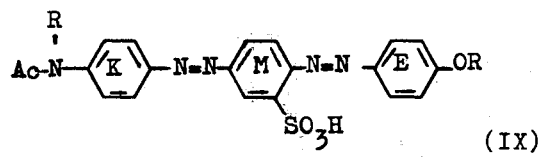

wherein
R has the above significance and
the nuclei K, M and E can be substituted as indicated.

Further valuable dyestuffs are those of formulae

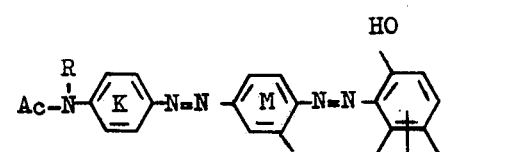

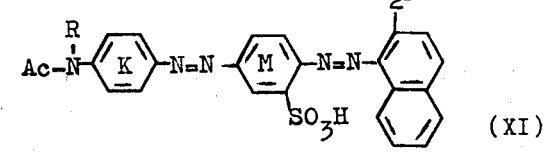

wherein
R, T and Ac have the above significance and the benzene nuclei K, M and E can be substituted as indicated.

Within the framework of the dyestuffs of formula (X), those in which the acylamino group is in the 8-position and the optionally substituted carboxylic acid amide group is in the 3-position are particularly preferred.

The alkoxy groups can possess further substituents, for example OH groups.

Representative substituted and unsubstituted alkoxy groups are for example —OCH$_3$, —OC$_2$H$_5$, —OC$_3$H$_7$, —OC$_4$H$_9$, —OCH$_2$CH$_2$OH and —OCH$_2$C$_6$H$_5$.

Preferred alkoxy groups are those with 1 – 7 C atoms.

Suitable acylamino groups are for example formylamino groups, alkylcarbonylamino, arylcarbonylamino, alkylsulphonylamino, and arylsulphonylamino groups such as —NHCHO, —NHCOCH$_3$, —NHCOCH$_2$Cl, —NHCOC$_2$H$_5$, —NHCOC$_6$H$_5$,

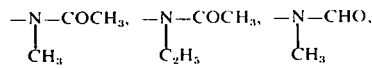

—NH—CO—C$_6$H$_4$Cl, and —NH—CO—C$_6$H$_4$—NO$_2$.

Suitable carboxylic acid amide groups are for example —CONH$_2$, —CONHC$_6$H$_5$ and carboxylic acid anilides which are for example substituted in the phenyl nucleus by alkyl such as methyl, alkoxy such as methoxy, or halogen.

Suitable alkyl radicals are for example —CH$_3$, —C$_2$H$_5$, —C$_3$H$_7$, —C$_4$H$_9$, —CH$_2$C$_6$H$_5$, and —CH$_2$—C$_6$H$_4$Cl. Preferred alkyl groups are those with 1 – 7 C atoms. Suitable acyl radicals are for example formyl, alkyl- and aryl-carbonyl or -sulphonyl radicals, which can optionally be substituted in the alkyl groups or aryl groups.

Suitable non-ionic substituents or substituents for the nuclei A and K are for example alkyl groups, especially those with 1 – 7 C atoms, halogen such as F, Cl or Br, alkoxy groups such as —OCH$_3$, —OC$_3$H$_7$ and —OC$_4$H$_9$, alkoxycarbonyl groups such as —COOCH$_3$, —COOC$_2$H$_5$, —COOC$_3$H$_7$ and —COOC$_4$H$_9$, as well as aryl radicals such as phenyl and chlorophenyl as well as acylamino groups such as especially alkylcarbonylamino, arylcarbonylamino, alkylsulphonylamino, arylsulphonylamino and formyl groups, carbonamide groups and sulphonamide groups, for example —CONH$_2$, —CONHC$_6$H$_5$, —SO$_2$NH$_2$, —SO$_2$NHCH$_3$, —SO$_2$NHC$_2$H$_5$, —SO$_2$N(C$_2$H$_5$)$_2$, —CON(C$_2$H$_5$)$_2$ and —CONHC$_6$H$_5$.

The dyestuffs of formula (I) are obtained by reaction of diazotised aminomonoazo compounds of formula

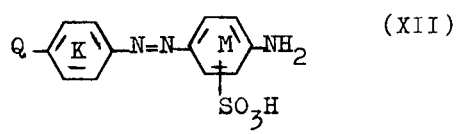

(XII)

wherein
Q has the abovementioned significance and the benzene nuclei K and M can be substituted as indicated, with coupling components of formula

H—A—X—H     (XIII)

wherein
A and X have the abovementioned significance, and optionally subsequent alkylation of the disazo dyestuffs of formula

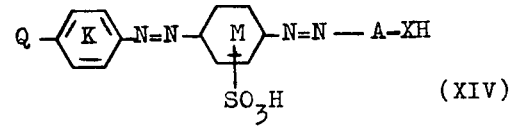

(XIV)

thus obtained.

The aminomonoazo compounds (XII) are obtained in the usual manner by a. combining a diazotised amino compound containing sulphonic acid groups, of formula

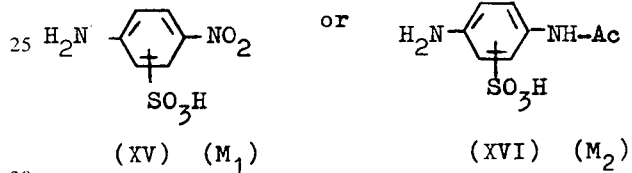

(XV) (M$_1$)     (XVI) (M$_2$)

wherein
Ac denotes an acyl radical, (subsequently referred to as middle components M$_1$ or M$_2$), with a phenolic coupling component of formula

(XVII) , optionally alkylating the resulting hydroxymonoazo compound and when using M$_1$ reducing the nitro group or when using M$_2$ saponifying the acylamino group to the amino group, or b. combining a diazotised middle component M$_1$ or a diazotised middle component

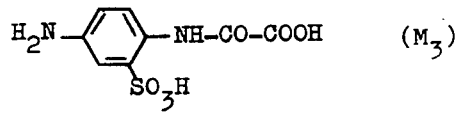

(M$_3$)

with a coupling component of formula

(XVIII)

wherein
R represents hydrogen or an alkyl group,
in the resulting amino-monoazo compound, if M$_1$ is used as the diazo component, acylating the amino group and subsequently reducing the nitro group, or if M$_3$ is used as the diazo component, saponifying the oxalic acid radical and subsequently acylating the free amino group of the coupling component (XVIII).

In some cases the coupling with the aminobenzene coupling component (XVIII) takes place more easily if its N-methanesulphonic acid is used. In these cases it is of course necessary, in order to prepare the aminoazo compound (XII), first to split off this protective group in the usual manner and then to proceed further as described.

The following starting components may for example be quoted for the synthesis of the dyestuffs (I) according to the invention or of the precursors (XII):

a. Middle components ($M_1$, $M_2$):

1-Amino-4-nitrobenzene-2- or -3-sulphonic acid, 1-amino-4-N-acetyl-, formyl-, chloracetyl-, -propionyl-, -benzoyl-, -3'- or 4'-nitrobenzoyl-aminobenzene-2-sulphonic acid, 5-nitro-2-amino-1-methoxybenzene-3- or 4-sulphonic acid, 5-amino-2-acetylamino-1-methoxybenzene-4-sulphonic acid, 5-nitro-2-amino-1-phenoxybenzene-4-sulphonic acid and 1-amino-4-N-oxaloylaminobenzene-3-sulphonic acid;

b. phenolic coupling components (XVII):

phenol, 2- or -3-methyl-phenol, 1-hydroxybenzene-2-carboxylic acid-alkyl ester (for example the methyl, ethyl or amyl esters), 2- or 3-chlorophenol, 2,6-dichlorophenol, 2-nitrophenol, 5-chloro-2-nitrophenol, 2-methyl-3- or -5- or -6-chlorophenol, 3-methyl-6-chlorophenol, 2-ethylphenol, 2,3- or 2,5- or 2,6- or 3,5-dichlorophenol, 2,6-diethylphenol, 2-cyclohexylphenol, 2-methoxyphenol or ethoxyphenol, 3-methoxyphenol, 3-hydroxybenzaldehyde, 2-hydroxyacetophenone, 2-hydroxy-3-methoxybenzaldehyde and 2- or 3-acetylaminophenol;

c. coupling components (XVIII)

aniline, N-methyl-aniline, 1-amino-3-methylbenzene, 1-amino-2- or 3-methoxybenzene, 1-amino-2-ethoxybenzene, 1-amino-2-methoxy- or ethoxy-5-methylbenzene, 1-amino-2-methyl-5-methoxybenzene, 1(N-methyl-amino)-3-methylbenzene, 1-amino-2,5-dimethoxy- or ethoxybenzene and 2-amino-1-methoxy-4-chlorobenzene or their N-methanesulphonic acids;

d. coupling components (XIII):

In addition to the coupling components (XVII or XVIII), 4-methylphenol, 4-tert.-butylphenol, 4-phenylphenol, 2-hydroxynaphthalene, 2-hydroxy-8-N-acetylamino- or N-methanesulphonylamino-naphthalene, 2-hydroxynaphthalene-3-carboxylic acid anilide and anilides which are for example substituted in the aniline nucleus by chlorine, methyl, methoxy or trifluoromethyl, and also 2-aminonaphthalene, 2-aminonaphthalene-1-sulphonic acid (wherein the coupling takes place in the 1-position with elimination of the sulphonic acid group), and 2-aminonaphthalene-N-methanesulphonic acid.

The new dyestuffs are particularly suitable for dyeing and printing natural and synthetic fibre materials containing amide groups, for example those of wool, silk and polyamide such as poly-ε-caprolactam or the reaction product of hexamethylenediamine with adipic acid. The resulting dyeings, especially those on polyamide materials, are distinguished by good fastness properties; in particular, by good wet fastness properties and good light fastness properties. The neutral absorption capacity and the combination behaviour with other suitable dyestuffs for this material are also good.

EXAMPLE 1

A. Manufacture of the Aminoazo Compound.

23 g (0.1 mol) of 1-amino-4-acetylaminobenzene-2-sulphonic acid are dissolved in 200 ml of water to give a neutral solution, 28 ml of 28% strength hydrochloric acid are added and the material is diazotised in the usual manner with 70 ml of 10% strength sodium nitrite solution at 0° to 5° with the addition of ice. Excess nitrous acid is destroyed with amidosulphonic acid before the coupling.

For the coupling, 9.5 g of phenol are dissolved in 200 ml of water by means of 10 ml of 40% strength sodium hydroxide solution, 140 ml of 20% strength sodium carbonate solution are added thereto, the mixture is cooled to 0° with ice and the prepared diazonium salt mixture is added.

After completion of coupling, the mixture is rendered neutral (pH 7) with hydrochloric acid, optionally salted-out with sodium chloride, and the N-acetyl-hydroxy-monoazo compound isolated.

After saponification with 4% strength sodium hydroxide solution, the hydroxyamino-monoazo dyestuff of formula

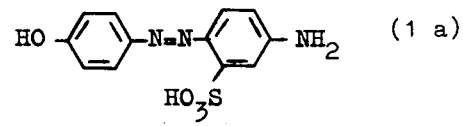

is obtained therefrom. For the alkylation, the N-acetyl-hydroxy-monoazo compound is dissolved in 1500 ml of water by means of sodium hydroxide solution at pH 8 to 10. Approximately 40 ml of dimethylsulphate are added dropwise at 40° and pH 10, with vigorous stirring. The resulting methylated dyestuff is isolated after stirring until cold, the paste is dissolved hot in 700 ml of 4% strength sodium hydroxide solution for saponification, and the solution is then kept at 95 – 98° for 1 to 1½ hours until the splitting off of the N-acetyl radical is complete. The mixture is now neutralised with hydrochloric acid and the resulting methoxy-amino compound of formula

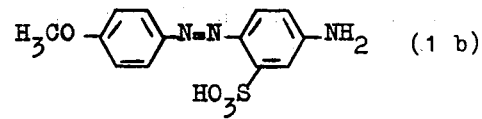

is isolated.

If instead of dimethylsulphate, diethylsulphate or ethyl bromide or ethyl chloride is used for the alkylation, then the ethoxy-amino compound of formula

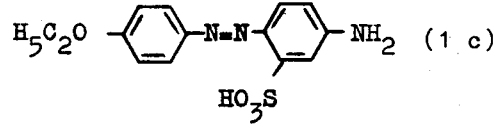

is obtained after saponification and working-up.

The propylation of the N-acetyl-hydroxy-monoazo compound is carried out with propyl bromide. After saponification of the N-acetyl group the propoxy-amino compound (1 d) is isolated.

The compound 1 b can also be obtained as follows: 21.8 ml (0.1 mol) of 1-amino-4-nitrobenzene-2-sulphonic acid are dissolved at pH 7 with about 150 ml of hot water and with sodium carbonate solution, and 70 ml of 10% strength sodium nitrite solution are added. The mixture is run at 0° to 5° into a vessel containing 28 ml of 28% strength hydrochloric acid and about 150 g of ice.

Excess nitrous acid which may be present is removed by amidosulphonic acid before the coupling. The diazonium salt mixture is then added, at 0° to 5°, to a solution of 9.5 g of phenol in 50 ml of water and about 10 ml of 40% strength sodium hydroxide solution and the coupling mixture is kept alkaline by adding approximately a further 12 ml of sodium hydroxide solution.

After completion of coupling, the mixture is salted-out with sodium chloride at about 60° and after adding about 14 ml of hydrochloric acid the product is isolated at room temperature from the mixture which is acid to Congo Red.

For the methylation, the resulting paste is dissolved in 400 ml of water, rendered alkaline with sodium hydroxide, at pH 11. About 50 ml of dimethylsulphate are slowly added dropwise with vigorous stirring and simultaneously about 50 ml of sodium hydroxide solution (40% strength) are consumed in order to keep the solution at pH 10 to 11. After completion of the methylation, the product is salted-out with sodium chloride and filtered off.

The methoxy compound thus obtained is dissolved in 700 ml of water under neutral conditions and mixed at 65° with a solution of 24 g of sodium sulphide (60% strength) in 200 ml of water. The whole is stirred for about 30 minutes at pH 9 until the reduction of the nitro group to the amino group is complete, and the resulting 4'-methoxy-4-amino-azo-benzene-2-sulphonic acid (1 b) obtained is isolated in the usual manner. (Where appropriate, it is recrystallised in order to remove sulphur).

B. Diazotisation and Coupling on to the Diazo Dyestuff

In order to manufacture the disazo dyestuffs, the following procedure is adopted: 30.7 g (0.1 mol) of the 4'-methoxy-4-amino-azo-benzene-2-sulphonic acid (1 b) described above are dissolved in about 300 ml of water (40°) at pH 7 – 8 by means of sodium hydroxide solution, and are mixed with 70 ml of 10% strength sodium nitrite solution. This mixture is diazotised by allowing it to run into a mixture of 28 ml of 28% strength hydrochloric acid and 50 ml of water at 50°, with the addition of ice. The whole is stirred for a further hour and any possible excess of nitrous acid is then removed with amidosulphonic acid.

This diazonium salt mixture is combined with a solution of 9.5 g of phenol in 200 ml of water and 10 ml of 40% strength sodium hydroxide solution as well as 140 ml of 20% strength sodium carbonate solution at 0°, with addition of ice. After completion of coupling, the mixture is neutralised with hydrochloric acid (pH 7) and the resulting dyestuff is isolated in the usual manner. The dried dyestuff represents a dark brown powder which dissolves in water to give a golden yellow colour, and in the form of the free acid corresponds to the formula

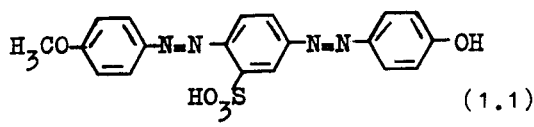

(1.1)

The dyestuff dyes polyamide material, for example fibres of poly-ε-caprolactam, in reddish-tinged yellow shades. The dyeing possesses good wet fastness and light fastness properties.

Entirely analogously, the dyestuffs of formula

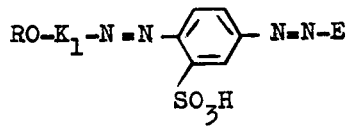

indicated in the table below are obtained using the 1st. coupling components $K_1$—OH indicated in column 1 (and where appropriate introducing the radical R by alkylation) and the end coupling components E quoted in column 3. The colour shade on polyamide is indicated in the last column.

Table

| No. | $K_1$—OH | R | E | Colour Shade on Polyamide |
| --- | --- | --- | --- | --- |
| 1.2 | Phenol | Methyl | 3-Methyl-phenol | reddish-tinged yellow |
| 1.3 | " | " | 2-Methyl-phenol | " |
| 1.4 | " | " | 2-Carbomethoxy-phenol | " |
| 1.5 | " | " | 2-Carboethoxy-phenol | " |
| 1.6 | " | " | 2-Carboamyloxy-phenol | " |
| 1.7 | " | " | 2-Hydroxynaphthalene | yellowish-tinged red |
| 1.8 | " | " | 2-Hydroxy-8-acetyl-aminonaphthalene | bluish-tinged red |
| 1.9 | " | Ethyl | Phenol | reddish-tinged yellow |
| 1.10 | " | " | 2-Methyl-phenol | " |
| 1.11 | " | " | 3-Methyl-phenol | " |
| 1.12 | " | " | 2-Carbomethoxy-phenol | " |
| 1.13 | " | " | 2-Carboethoxy-phenol | " |
| 1.14 | " | " | 2-Hydroxy-3-naphthoic acid-anilide | claret |
| 1.15 | " | " | 2-Hydroxy-3-naphthoic acid-2'-methyl-anilide | " |
| 1.16 | " | " | 2-Hydroxy-3-naphthoic acid-2'-methoxy-anilide | " |
| 1.17 | " | Propyl | Phenol | reddish-tinged yellow |
| 1.18 | " | " | 2-Methyl-phenol | " |
| 1.19 | " | " | 3-Methyl-phenol | " |
| 1.20 | " | " | 2-Hydroxy-naphthalene | yellowish-tinged red |
| 1.21 | " | " | 2-Hydroxy-8-acetylamino-naphthalene | bluish-tinged red |
| 1.22 | " | 2-Hydroxy-ethyl | Phenol | reddish-tinged yellow |
| 1.23 | " | " | 2-Methyl-phenol | " |
| 1.24 | " | " | 3-Methyl-phenol | " |
| 1.25 | " | " | 2-Hydroxy-naphthalene | yellowish-tinged red |
| 1.26 | " | H | Phenol | yellow-orange |
| 1.27 | " | H | 2-Hydroxy-naphthalene | red |
| 1.28 | " | H | 2-Methyl-phenol | yellow-orange |
| 1.29 | " | H | 3-Methyl-phenol | yellow-orange |
| 1.30 | " | Ethyl | 2-Hydroxy-naphthalene | yellowish-tinged red |
| 1.31 | " | " | 2-Hydroxy-8-acetylamino-naphthalene | bluish-tinged red |

Table-continued

| No. | K₁—OH | R | E | Colour Shade on Polyamide |
|---|---|---|---|---|
| 1.32 | " | " | 2-Hydroxy-8-methylsulphonylamino-naphthalene | " |
| 1.33 | 3-Methyl-phenol | H | Phenol | yellow-orange |
| 1.34 | " | H | 2-Methyl-phenol | " |
| 1.35 | " | Methyl | 3-Methyl-phenol | " |
| 1.36 | " | Ethyl | Phenol | reddish-tinged yellow |
| 1.37 | " | " | 3-Methyl-phenol | " |
| 1.38 | " | " | 2-Hydroxy-naphthalene | yellowish-tinged red |
| 1.39 | " | " | 2-Hydroxy-3-naphthoic acid-anilide | claret |
| 1.40 | " | " | 2-Hydroxy-3-naphthoic acid-2' methoxy-anilide | " |
| 1.41 | 2-Methyl-phenol | H | Phenol | yellow-orange |
| 1.42 | " | H | 2-Methyl-phenol | " |
| 1.43 | " | H | 3-Methyl-phenol | " |
| 1.44 | " | Ethyl | Phenol | reddish-tinged yellow |
| 1.45 | " | " | 2-Hydroxy-naphthalene | yellowish-tinged red |
| 1.46 | " | " | 2,6-Di-hydroxy-naphthalene | red |
| 1.47 | " | " | 2-Hydroxy-8-acetylamino-naphthalene | bluish-tinged red |
| 1.48 | Phenol | Methyl | 2-Nitrophenol | reddish-tinged yellow |
| 1.49 | " | " | 2-Chlorophenol | " |
| 1.50 | " | Ethyl | 2,5-Dichlorophenol | " |
| 1.51 | " | " | 2N-acetylamino-phenol | yellow-orange |
| 1.52 | " | " | 3N-acetylamino-phenol | " |
| 1.53 | " | " | 2,6-Dimethyl-phenol | reddish-tinged yellow |
| 1.54 | " | " | 2-Ethylphenol | reddish-tinged yellow |
| 1.55 | " | " | 2-Amino-naphthalene-1-sulphonic acid | red |
| 1.56 | " | — | " | " |
| 1.57 | " | Propyl | " | " |
| 1.58 | " | Methyl | " | " |
| 1.59 | 2-Methylphenol | " | " | " |
| 1.60 | " | Ethyl | " | " |
| 1.61 | 3-Methylphenol | " | " | " |
| 1.62 | " | Methyl | " | " |
| 1.63 | Phenol | Methyl | 4-Methylphenol | yellow-orange |
| 1.64 | " | " | 4-tert.-Butyl-phenol | " |
| 1.65 | " | " | 4-Phenyl-phenol | " |
| 1.66 | " | H | 4-Methylphenol | " |

Dyeing Process 100 mg of the dyestuff are dissolved hot in 100 ml of water, 5 ml of 10% strength ammonium acetate solution are added, the mixture is diluted to a volume of 500 ml with water, and 10 g of polyamide fibre are introduced into the dyebath. The dyebath is raised to the boil over the course of 20 minutes, 4 ml of 10% strength acetic acid are added and the whole then kept at the boil for 1 hour. Thereafter the goods are rinsed and dried at 70° to 80°.

EXAMPLE 2

0.1 mol of the hydroxy-dis-azo dyestuff (1.1) manufactured according to Example 1 are dissolved hot in 3500 ml of water. Dimethylsulphate is now slowly added at 60° and a pH-value of 10, with vigorous stirring, and the methylation is followed chromatographically. After stirring until cold, the methylated dyestuff is isolated and dried. In the form of the free acid, the dyestuff corresponds to the formula

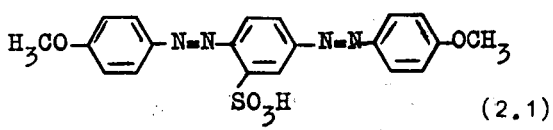

(2.1)

and represents a dark brown powder which dissolves in hot water with a yellow colour. Polyamide materials are dyed in yellow-orange-coloured shades. The dyeing possesses good wet fastness and light fastness properties.

If the hydroxy-disazo dyestuff (1.1) is ethylated with diethylsulphate or with ethyl bromide or chloride, a dyestuff is obtained which in the form of the free acid corresponds to the formula

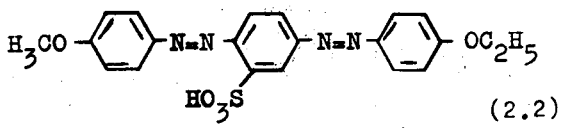

(2.2)

and which dyes polyamide in yellow-orange-coloured shades of good light fastness and wet fastness.

If the hydroxy-disazo dyestuff (1.1) is reacted with propyl bromide or chloride, a dyestuff is obtained (2.3), which dyes polyamide in yellow-orange-coloured shades having good fastness properties.

The table which follows quotes further dyestuffs which in the form of the free acid correspond to the formula

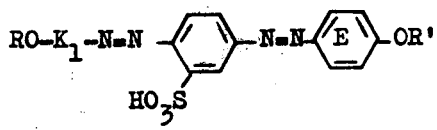

These dyestuffs are obtained by analogous alkylation of the hydroxydisazo dyestuff, given in the 1st. column, of formula

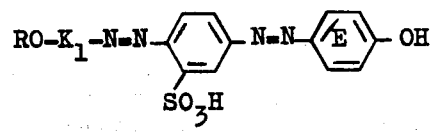

wherein
the ring E can optionally possess non-ionic substituents.

The last column gives the colour shade on polyamide.

Table

| Hydroxydisazo Dyestuff | R' | Colour Shade on Polyamide |
|---|---|---|
| 1.2 | Methyl | reddish-tinged yellow |
| 1.2 | Ethyl | " |
| 1.2 | Propyl | " |
| 1.2 | 2-Hydroxy-ethyl | " |
| 1.3 | Methyl | " |
| 1.9 | " | " |
| 1.10 | " | " |
| 1.11 | " | " |
| 1.17 | " | " |
| 1.18 | " | " |
| 1.19 | " | " |
| 1.22 | " | " |
| 1.26 | " | " |
| 1.28 | " | " |
| 1.29 | " | " |
| 1.33 | " | " |
| 1.35 | " | " |
| 1.36 | " | " |
| 1.49 | " | " |
| 1.50 | " | " |
| 1.9 | Ethyl | " |
| 1.11 | " | " |
| 1.17 | " | " |
| 1.19 | " | " |
| 1.26 | " | " |
| 1.29 | " | " |
| 1.33 | " | " |
| 1.35 | " | " |
| 1.36 | " | " |
| 1.37 | " | " |
| 1.41 | " | " |
| 1.49 | " | " |
| 1.52 | " | " |

EXAMPLE 3

A. Manufacture of the Monoazo Dyestuff 26 g (0.1 mol) of 1-amino-4-oxalylaminobenzene-3-sulphonic acid are dissolved in 50 ml of water under neutral conditions (pH 7), 28 ml of 28% strength hydrochloric acid are added and the mixture is diazotised with 70 ml of 10% strength sodium nitrite solution at 10 to 15°. Excess nitrous acid is destroyed with amidosulphonic acid. 9.5 g of phenol, dissolved in 200 ml of water by means of 10 ml of sodium hydroxide solution (40% strength), and mixed with 140 ml of sodium carbonate solution (20% strength), are combined with the above diazonium salt mixture at 0° to 5°. After completion of coupling, the monoazo dyestuff is salted-out under neutral conditions with sodium chloride, and isolated.

If the coupling product is kept for about 30 minutes in 700 ml of 4% strength sodium hydroxide solution at 90° – 95°, then, after neutralisation with hydrochloric acid, the hydroxy-amino-azo-benzenesulphonic acid of formula

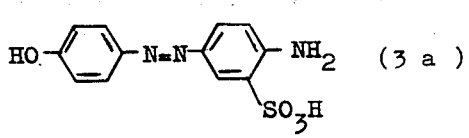

is obtained by salting-out. If 0.1 mol of coupling product is methylated by dissolving in 2000 ml of water under neutral conditions (pH 7), adding dimethylsulphate dropwise at 40° to 45°, whilst maintaining pH 9 – 10 with sodium hydroxide solution, and subsequently saponifying the resulting compound with 4% strength sodium hydroxide solution at 90° – 95° in about 1 hour, then after neutralisation the methoxy-amino-azobenzenesulphonic acid of formula

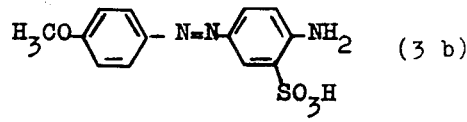

is isolated.

After appropriate ethylation, for example with diethylsulphate or ethyl bromide, and subsequent saponification with sodium hydroxide, 4'-ethoxy-4-amino-azobenzene-3-sulphonic acid (3 c) is obtained.

The reaction with propyl bromide after saponification yields 4'-propoxy-4-amino-azobenzene-3-sulphonic acid (3 d).

B. Manufacture of the Disazo Dyestuff 0.1 mol of the 4'-methoxy-4-amino-azobenzene-3-sulphonic acid (3 b) which has been described is stirred with 600 ml of water under neutral conditions, 70 ml of 10% strength sodium nitrite solution are added, and the mixture is introduced at 25° to 30° into a vessel containing 28 ml of 28% strength hydrochloric acid and stirred for 1 hour. After completion of diazotisation, excess nitrous acid is destroyed with amidosulphonic acid and the diazonium salt which has precipitated is isolated by filtration. The resulting paste is suspended in 600 ml of ice water and is added at 0° – 5° to a solution of 9.5 g of phenol in 200 ml of water, 10 ml of 10% strength sodium hydroxide solution and 140 ml of 20% strength sodium carbonate solution.

After completion of coupling, the mixture is neutralised with hydrochloric acid (pH 6–7) and the dyestuff which has precipitated is isolated. The dried ground dyestuff represents a dark powder which dissolves in water to give a yellow colour and dyes Perlon in yellow-orange-coloured shades. In the form of the free acid, the dyestuff corresponds to the formula

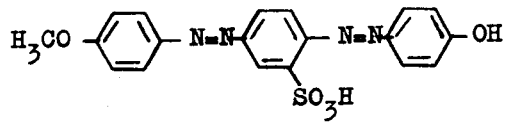

If this dyestuff is reacted with dimethylsulphate in a corresponding manner to that described in Example 2, the dyestuff of formula

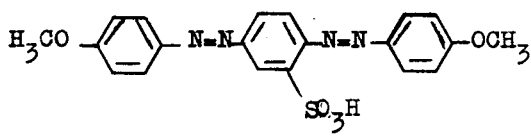

is obtained, which dissolves in water with a yellow colour and dyes polyamide in yellow-orange-coloured shades of good light fastness properties. The dyestuff is identical with dyestuff 2.1.

Table I below quotes further dyestuffs which are obtained in an analogous manner and which in the form of the free acid correspond to the formula Column 1 indicates the aminoazo compounds used as starting compounds, column 2 the end coupling components and column 3, where phenolic end coupling components and subsequent alkylation are used, the alkyl radical in the alkoxy group. Column 4 gives the colour shade on polyamide.

Table I

| Aminoazo Compound | E | R' | Colour Shade on Polyamide |
|---|---|---|---|
| 3 a | Phenol | — | reddish-tinged yellow |
| '' | 3-Methylphenol | — | '' |
| '' | 2-Hydroxynaphthalene | — | yellowish-tinged red |
| '' | 2-Aminonaphthalene-1-sulphonic acid | — | bluish-tinged red |
| 3 b | 2-Methylphenol | — | reddish-tinged yellow |
| '' | '' | Methyl | '' |
| '' | '' | Ethyl | '' |
| '' | 3-Methylphenol | — | '' |
| '' | '' | Methyl | '' |
| '' | '' | Ethyl | '' |
| '' | '' | Hydroxyethyl | '' |
| '' | '' | Propyl | '' |
| '' | 2-Carbomethoxy-phenol | — | '' |
| '' | 2-Carboethoxy-phenol | — | '' |
| '' | 2-Carboamyloxy-phenol | — | '' |
| '' | 2-Hydroxy-naphthalene | — | yellowish-tinged red |
| '' | 2-Hydroxy-8-acetylamino-naphthalene | — | bluish-tinged red |
| '' | 2-Hydroxy-naphthoic acid-(3)-anilide | — | '' |
| '' | 2-Hydroxy-naphthoic acid-(3)-2'-methoxy-anilide | — | '' |
| '' | 2-Amino-naphthalene-1-sulphonic acid | — | '' |
| '' | Phenol | Methyl | reddish-tinged yellow |
| '' | '' | Ethyl | '' |
| '' | '' | Propyl | '' |
| '' | '' | Hydroxyethyl | '' |
| '' | '' | — | reddish-tinged yellow |
| 3 c | '' | Methyl | '' |
| '' | '' | Ethyl | '' |
| '' | '' | Propyl | '' |
| '' | '' | Hydroxyethyl | '' |
| '' | 2-Methylphenol | — | '' |
| '' | '' | Methyl | '' |
| '' | 3-Methylphenol | — | '' |
| '' | '' | Methyl | '' |
| '' | '' | Ethyl | '' |
| '' | 2-Carboethoxy-phenol | — | '' |
| '' | 2-Hydroxy-naphthalene | — | yellowish-tinged red |
| '' | 2-Hydroxy-3-naphthoic acid-2'-methyl-anilide | — | bluish-tinged red |
| '' | 2-Amino-naphthalene-1-sulphonic acid | — | bluish-tinged red |
| 3 d | Phenol | — | reddish-tinged yellow |
| '' | '' | Methyl | '' |
| '' | '' | Ethyl | '' |
| '' | 3-Methylphenol | — | '' |
| '' | '' | Methyl | '' |
| '' | '' | Ethyl | '' |
| '' | 2-Carboethoxy-phenol | — | '' |
| '' | 2-Hydroxy-naphthalene | — | yellowish-tinged red |
| '' | 2-Amino-naphthalene-1-sulphonic acid | — | bluish-tinged red |

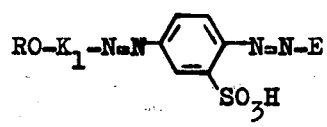

(a)

wherein
E represents the radical of the end coupling component or its o-alkyl derivative.

Table II quotes further dyestuffs (a) obtainable in an analogous manner and here column 1 gives the 1st. coupling component K$_1$—OH, column 2 the radical R, column 3 the end coupling component E and column 4, where phenolic end coupling components and subsequent alkylation are used, the alkyl radical of the alkoxy group in the final dyestuff. The last column describes the shade on polyamide.

Table II

| K$_1$—OH | R | E | R' | Colour Shade on Polyamide |
|---|---|---|---|---|
| 2-Methylphenol | Methyl | Phenol | Methyl | reddish-tinged yellow |
| '' | '' | 2-Methyl-phenol | — | '' |
| '' | '' | '' | Methyl | '' |
| '' | Ethyl | '' | — | '' |
| 3-Methylphenol | Methyl | Phenol | — | '' |
| '' | '' | '' | Methyl | '' |
| '' | '' | '' | Ethyl | '' |
| '' | Ethyl | '' | Methyl | '' |
| '' | '' | '' | Ethyl | '' |
| '' | Methyl | 2-Methylphenol | — | '' |
| '' | '' | '' | Methyl | '' |
| '' | '' | '' | Ethyl | '' |
| '' | Ethyl | '' | — | '' |
| '' | '' | 3-Methylphenol | — | '' |
| '' | '' | '' | Methyl | '' |

Table II-continued

| $K_1$—OH | R | E | R' | Colour Shade on Polyamide |
|---|---|---|---|---|
| '' | '' | '' | Ethyl | '' |
| '' | '' | '' | Propyl | '' |
| '' | Methyl | '' | — | '' |
| '' | '' | '' | Methyl | '' |
| '' | '' | '' | Ethyl | '' |
| '' | '' | 2-Hydroxy-naphthalene | — | yellowish-tinged red |
| '' | '' | 2-Amino-naphthalene-1-sulphonic acid | — | bluish-tinged red |
| '' | Ethyl | '' | — | '' |
| '' | Propyl | '' | — | '' |
| 2-Carboethoxy-phenol | — | '' | — | '' |
| '' | Methyl | '' | — | '' |
| 3-Chlorophenol | '' | '' | — | '' |
| 2,5-dichloro-phenol | '' | '' | — | '' |
| 3-Methoxyphenol | '' | '' | — | '' |
| 3-Acetylamino-phenol | '' | '' | — | '' |

EXAMPLE 4

26 g (0.1 mol) of 1-amino-4-oxaloylaminobenzene-3-sulphonic acid are diazotised as indicated and combined at 0° with a solution of 0.1 mol of aniline-N-ω-methanesulphonic acid in 100 ml of ice water and 45 ml of 20% strength sodium acetate solution at 0°. 30 ml of 20% strength sodium carbonate solution are further added, and the mixture is stirred until the coupling is complete. The resulting azo compound is isolated by salting-out with potassium chloride. The paste which has been filtered off, in 450 ml of water, is saponified with 90 ml of 40% strength sodium hydroxide solution for 2 hours at 95°. After completion of the saponification 75 ml of sodium bicarbonate are added, the mixture is stirred for about 2 hours and the diaminoazobenzenesulphonic acid is isolated. For the acetylation, the paste is stirred with 500 ml of water and neutralised with hydrochloric acid, and about 15 ml of acetic anhydride are added dropwise at 60°. The N-acetylamino-aminoazobenzene-sulphonic acid of formula

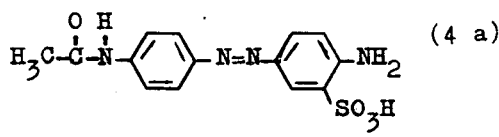

(4 a)

is isolated by salting-out.

If N-methylaniline is used as the coupling component, the N-acetyl-methylamino-aminoazobenzenesulphonic acid of formula

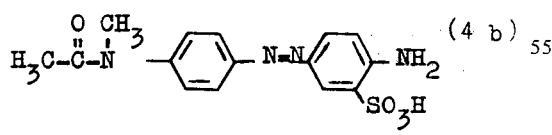

(4 b)

is obtained.

With 1-amino-3-methylbenzene as the coupling component, the compound of formula

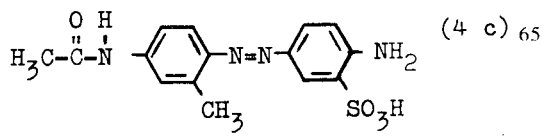

(4 c)

is obtained.

If acetylation is carried out with benzoyl chloride instead of acetic anhydride, the corresponding benzoyl compounds are obtained:

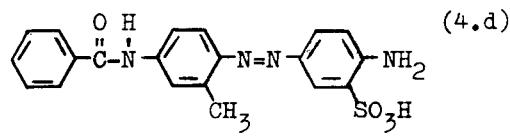

(4.d)

In order to manufacture the disazo dyestuff, 0.1 mol of the 4'-N-acetylamino-4-amino-azobenzene-3-sulphonic acid (4 a) are dissolved in 200 ml of water under neutral conditions, 70 ml of 10% strength sodium nitrite solution are added and the mixture is diazotised by running it into 28 ml of 28% strength hydrochloric acid at 20°. 9.5 g of phenol, dissolved in 200 ml of water by means of 10 g of 40% strength sodium hydroxide solution, are combined with 140 ml of 20% strength sodium carbonate solution and the above diazonium salt solution at 0°. After completion of coupling, the resulting dyestuff of formula

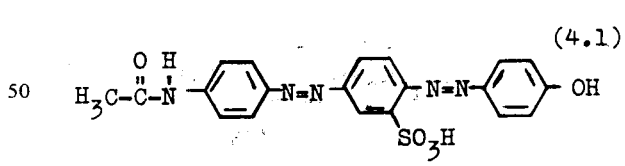

(4.1)

is isolated in the usual manner. The dried dyestuff represents a dark powder which dissolves in water with a yellow colour. Polyamide material is dyed in yellow-orange shades.

If the dyestuff is reacted with dimethylsulphate at 40° as indicated, the dyestuff of formula

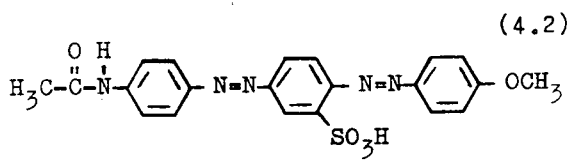

(4.2)

is isolated. The dyestuff dyes polyamide in yellow-orange-coloured shades of good wet fastness and light fastness.

Table I below describes analogously obtainable dyestuffs of general formula

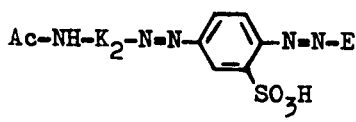 (a)

Here column 1 gives the aminoazo compound column 2 gives the end coupling component, column 3 (in the case where phenolic end coupling components and subsequent alkylation are used) gives the alkyl radical R' of the alkoxy group and the last column gives the colour shade of polyamide.

Table I

| Aminoazo Compound | E | R' | Colour Shade on Polyamide |
|---|---|---|---|
| 4 a | Phenol | Ethyl | reddish-tinged yellow |
| ″ | ″ | Propyl | ″ |
| ″ | 3-Methylphenol | — | ″ |
| ″ | ″ | Methyl | ″ |
| ″ | ″ | Ethyl | ″ |
| ″ | 2-Carbomethoxy-phenol | — | ″ |
| ″ | 2-Carboethoxy-phenol | — | ″ |
| ″ | 2-Hydroxy-naphthalene | — | yellowish-tinged red |
| ″ | 2-Hydroxy-8-acetylamino-naphthalene | — | bluish-tinged red |
| ″ | 2-Amino-naphthalene-1-sulphonic acid | — | ″ |
| 4 b | Phenol | — | reddish-tinged yellow |
| ″ | ″ | Methyl | ″ |
| ″ | ″ | Ethyl | ″ |
| ″ | 3-Methylphenol | — | ″ |
| ″ | ″ | Methyl | ″ |
| ″ | 2-Amino-naphthalene-2-sulphonic acid | — | bluish-tinged red |
| 4 c | Phenol | Methyl | reddish-tinged yellow |
| ″ | ″ | Ethyl | ″ |
| ″ | 2-Methylphenol | — | ″ |
| ″ | ″ | Methyl | ″ |
| ″ | 3-Methylphenol | — | ″ |
| ″ | ″ | Ethyl | ″ |
| ″ | 2-Amino-naphthalene-1-sulphonic acid | — | bluish-tinged red |
| 4 d | Phenol | — | reddish-tinged yellow |
| ″ | 2-Methylphenol | — | ″ |
| ″ | 2-Chlorophenol | — | ″ |
| ″ | Phenol | Methyl | ″ |
| ″ | ″ | Ethyl | ″ |
| ″ | 2-Aminonaphthalene-1-sulphonic acid | — | bluish-tinged red |

Table II gives further dyestuffs (a) obtainable in an analogous manner. Here, column 1 gives the 1st. coupling component $K_2$—$NH_2$, column 2 the acyl radical Ac, column 3 the end coupling component E, and column 4, where phenolic end coupling components and subsequent alkylation are used, the alkyl radical R' of the alkoxy group. The last column gives the colour shade on polyamide.

Table II

| $K_2$—$NH_2$ | Ac | E | R' | Colour Shade on Polyamide |
|---|---|---|---|---|
| Aniline | Benzoyl | 2-Aminonaphthalene-1-sulphonic acid | — | bluish-tinged red |
| ″ | 4-Chlorobenzoyl | ″ | — | ″ |
| ″ | Propionyl | ″ | — | ″ |
| ″ | Chloracetyl | ″ | — | ″ |
| 3-Methyl-aniline | 3-$CF_3$-benzoyl | Phenol | — | reddish-tinged yellow |
| ″ | ″ | ″ | Methyl | ″ |

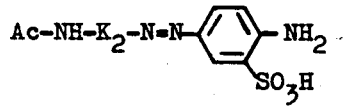

EXAMPLE 5

The 4'-N'-acetylamino-4-aminoazobenzene-2-sulphonic acid (5 a) is obtained by coupling diazotised 1-amino-4-nitrobenzene-2-sulphonic acid with aniline-N-methanesulphonic acid, subsequently splitting off the N-methanesulphonic acid radical, acylating the free amino group with acetic anhydride and reducing the nitro group with sodium sulphide in the usual manner.

If 1-amino-3-methylbenzene-N-methane-sulphonic acid is used as the coupling component, 4'-N-acetylamino-4-amino-2'-methylazobenzene-2-sulphonic acid (5 b) is obtained in accordance with the above procedure.

With 1-amino-2- or 3-methoxy-benzene as coupling components, 4'-N-acetylamino-4-amino-3'-methoxy-azobenzene-2-sulphonic acid (5 c) or 4'-N-acetylamino-4-amino-2'-methoxyazobenzene-2-sulphonic acid (5 d) are obtained.

If instead of acetic anhydride, benzoyl chloride is used as the acylating agent, 4'-N-benzoylamino-4- amino-azobenzene-2-sulphonic acid (5 e) is for example produced.

0.1 mol of 4'-N-acetylamino-4-amino-azobenzene-2-sulphonic acid is diazotised by the indirect method in the usual manner at room temperature and coupled at 0° – 5°, in the presence of sodium hydroxide, with 0.1 mol of phenol dissolved in water, and sodium hydroxide solution. The resulting dyestuff in the form of the free acid corresponds to the formula (5.1)

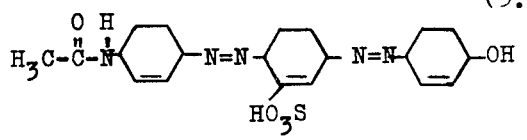

Here column 1 gives the aminoazo compound of formula

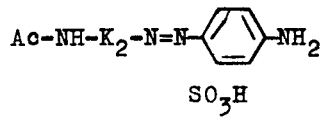

column 2 gives the end coupling component, column 3 (in the case where phenolic end coupling components and subsequent alkylation are used) gives the alkyl radical R' of the alkoxy group and the last column gives the colour shade on polyamide.

Table

| Aminoazo Compound | E | R' | Colour Shade on Polyamide |
|---|---|---|---|
| 5 a | Phenol | Ethyl | reddish-tinged yellow |
| ″ | ″ | Propyl | ″ |
| ″ | 2-Methyl-phenol | — | ″ |
| ″ | ″ | Methyl | ″ |
| ″ | ″ | Ethyl | ″ |
| ″ | 3-Methyl-phenol | — | ″ |
| ″ | ″ | Methyl | ″ |
| ″ | ″ | Ethyl | ″ |
| ″ | ″ | Hydroxyethyl | ″ |
| ″ | 2-Carboethoxy-phenol | — | ″ |
| ″ | 2-Hydroxy-naphthalene | — | red |
| ″ | 2-Amino-naphthalene-1-sulphonic acid | — | bluish-tinged red |
| 5 b | ″ | — | ″ |
| 5 c | ″ | — | ″ |
| 5 d | ″ | — | ″ |
| 5 e | ″ | — | ″ |
| ″ | Phenol | — | reddish-tinged yellow |
| ″ | ″ | Methyl | ″ |
| ″ | ″ | Ethyl | ″ |
| ″ | ″ | Propyl | ″ |
| ″ | 3-Methyl-phenol | — | ″ |
| ″ | ″ | Methyl | ″ |
| ″ | ″ | Ethyl | ″ |
| ″ | 2-Carbomethoxy-phenol | — | ″ |
| ″ | 2-Chlorophenol | — | ″ |
| ″ | 2-Ethyl-phenol | — | ″ |

In the dried state it represents a dark powder which dissolves in water to give a yellow colour. Polyamide material is dyed in yellow-orange-coloured shades.

If the above compound (5.1) is subjected to methylation, for example with dimethylsulphate in an analogous manner to that described in Example 2, the dyestuff of formula

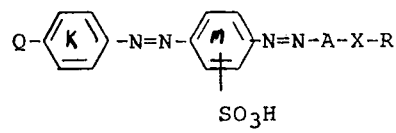

is obtained which when dyed onto polyamide material yields yellow-orange shades.

The table which follows quotes dyestuffs obtainable in an analogous manner, of general formula (a)

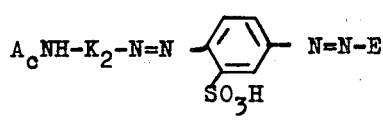

We claim:
1. Disazo dyestuff which in the form of the free acid corresponds to the formula

$$Q-\underset{}{\overset{}{\underset{}{K}}}-N=N-\underset{SO_3H}{\overset{}{\underset{}{M}}}-N=N-A-X-R$$

where Q is OH, alkoxy with 1–7 carbon atoms, hydroxy alkoxy with 1–7 carbon atoms, or benzyloxy; R is H; where A is phenylene;
X is —O— or —NH—;
and wherein M is unsubstituted or substituted by a member of the group Cl, alkyl with 1–7 carbon atoms, benzyl, chlorobenzyl, alkoxy with 1–7 carbon atoms, hydroxy alkoxy with 1–7 carbon atoms or benzyloxy; and
wherein A and K independently are unsubstituted or substituted by a member of the group F, Cl, Br, NO$_2$, OH, cyclohexyl, alkyl with 1–7 carbon atoms, alkoxy with 1–4 carbon atoms, alkoxy carbonyl with 1–5 carbon atoms, phenyl, or chlorophenyl.

* * * * *